US012800598B2

(12) United States Patent
Jain

(10) Patent No.: US 12,800,598 B2
(45) Date of Patent: Nov. 17, 2026

(54) METHOD, A SYSTEM AND AN APPARATUS FOR PAPERLESS LABORATORY MONITORING

(71) Applicant: Manisha Jain, Ambala Cannt. (IN)

(72) Inventor: Manisha Jain, Ambala Cannt. (IN)

(*) Notice: Subject to any disclaimer, the term of this patent is extended or adjusted under 35 U.S.C. 154(b) by 407 days.

(21) Appl. No.: 18/421,514

(22) Filed: Jan. 24, 2024

(65) Prior Publication Data

US 2024/0230696 A1 Jul. 11, 2024

(30) Foreign Application Priority Data

Jan. 5, 2023 (IN) ............................ 202311001123

(51) Int. Cl.
*G01N 35/00* (2006.01)

(52) U.S. Cl.
CPC . *G01N 35/00871* (2013.01); *G01N 35/00613* (2013.01); *G01N 2035/00881* (2013.01)

(58) Field of Classification Search
CPC ....... G01N 35/00871; G01N 35/00613; G01N 2035/00881
USPC ........................................................ 709/219
See application file for complete search history.

(56) References Cited

U.S. PATENT DOCUMENTS

| | | | | |
|---|---|---|---|---|
| 10,886,009 | B2 * | 1/2021 | Rivers | G16H 10/60 |
| 2005/0159982 | A1 * | 7/2005 | Showalter | G16H 10/40 705/2 |
| 2008/0005321 | A1 * | 1/2008 | Ma | H04L 41/0893 709/224 |
| 2020/0312448 | A1 * | 10/2020 | von Allmen | H04N 7/185 |
| 2022/0093244 | A1 * | 3/2022 | Davis | G06F 16/24578 |
| 2023/0135177 | A1 * | 5/2023 | McSweeney | G16C 20/80 707/722 |

* cited by examiner

*Primary Examiner* — Nicholas R Taylor

(57) ABSTRACT

A method and a system for paperless monitoring of a laboratory instrument comprises establishing a connection with the laboratory instrument and a computing device associated with a user via a remote server, by receiving a connection request from the computing device. The user also transmits a control instruction to control the laboratory instrument is received from the computing device via the remote server. The remote server allows the user to update control instruction based on the measurement data received from the laboratory instrument for controlled monitoring of the laboratory instrument.

20 Claims, 9 Drawing Sheets

METHOD, A SYSTEM AND AN APPARATUS FOR PAPERLESS LABORATORY MONITORING

CROSS-REFERENCE TO RELATED APPLICATION

This application claims priority to Indian Application Serial No. 202311001123, filed on Jan. 5, 2023, entitled "A METHOD, A SYSTEM AND AN APPARATUS FOR PAPERLESS LABORATORY MONITORING," commonly assigned with this application and incorporated herein by reference in its entirety.

FIELD OF THE DISCLOSURE

Embodiments of the present disclosure in general, concern a system, and a method to enable paperless monitoring of laboratory instruments using wireless transmission capabilities. More particularly, embodiments of the present disclosure concern to a system, and a method for controlling and managing information related to multiple laboratory instruments from a remote location.

BACKGROUND OF THE DISCLOSURE

With the advancements in technology, research has become a prerequisite for every researcher in diverse domains such as medical, chemical, production, R&D, analytical laboratories etc. Over the years, the laboratories have undergone immense changes in terms of size, staffing, reliability and operating mechanisms.

Conventionally, the instruments used in labs were bulky and had additional space constraints associated with them. Also, they require large number of skilled manpower for their operation. These drawbacks were ameliorated by reducing the weight and size of the instruments, and by increasing their efficiency.

Traditional laboratory instruments require operators to constantly monitor and control them, which resulted in increased number of hours spend by the operators near the instrument. The operators were required to input instructions to run the instrument and note down the results manually on paper for later analysis, which resulted in large amount of paper utilization. Also, if the readings required transmission to external supervisors or analysts, this led to an increased investment in transportation cost, thereby making the overall system time consuming and financially ineffective.

In addition, there are many experiments which relate to communicable viruses (such as Ebola, COVID-19, SAARS) and/or harmful gases etc. In such cases, manual contact with the instrument increases the risk of infection among the scientists. Therefore, to overcome the above said drawbacks faced during the use of traditional laboratory devices, remote transmission techniques were integrated with the laboratory instrument. However, the remote transmission techniques had certain concerns associated with them such as, privacy, requirement of separate instrument for monitoring, higher bandwidth for transmission which often leads to dropout of packets containing critical information resulting in inefficient laboratory monitoring from the remote location.

To address these issues, numerous devices have been invented in the past which can transmit data remotely to different locations but incorporate a fix set of commands that can be utilized by the operator. For example, the device is pre-programmed to execute a set of commands that cannot be altered by the operator, thereby restricting its use.

Moreover, as the device operating instructions cannot be modified, the device cannot alert the operator in case of any mishappening. For example, in some cases, the device may have a default emergency contact number which may/may not respond in state of emergency, therefore making the device less reliable.

Furthermore, a separate device is needed to control the experimental device from a remote location. Such separate device needs to be compliant with the experimental device. Therefore, making the overall system complex and less effective.

Nevertheless, despite of the advancements and continuous research, no such device has been devised in the past that can single-handedly control multiple devices using a single device, for example a portable device, that can control multiple devices present at distinct locations for different parameters such as, but not limited to, temperature, weather, humidity, and measurement control has not been disclosed in the prior known arts.

In view of the foregoing discussion, there is a need for an improved laboratory monitoring device and system that addresses the problems of the prior art. The applicant has devised, tested and embodied the present disclosure to overcome the shortcomings of the conventional laboratory monitoring devices and systems known in the art.

It is accordingly an object of the present disclosure to provide a laboratory instrument that can be communicatively coupled to a computing device, for example in the form of a display.

The applicant has devised, tested, and embodied the present disclosure to overcome the shortcomings of the state of the art and to obtain these and other purposes and advantages.

SUMMARY OF THE PRESENT DISCLOSURE

An object of the present disclosure is to provide a laboratory instrument having wireless transmission capabilities, provided therewith so as to obviate the disadvantages associated with the prior art.

It is yet another object of the present disclosure to track and manage the experiment related information of the laboratory instruments.

It is yet another object of the present disclosure to program the laboratory instruments using control instructions wherein the control instructions include control parameters comprising at least one of name of the laboratory instrument, usage model of the laboratory instrument, start duration of the laboratory instrument, end duration of the laboratory instrument, life of the laboratory instrument, duration of use of the laboratory instrument, information of one or more users authorized for the usage of the laboratory instrument, experiments allowed to perform using the laboratory instrument, and chemical or vaccine to be used in the laboratory instrument.

It is yet another object of the present disclosure to update the control instructions based on the measurement data received from the laboratory instruments.

It is further object of the disclosure to group one or more laboratory instrument to remotely monitor the laboratory instruments. The group of the one or more laboratory instrument can include a primary instrument and at least one secondary instrument, wherein the user can control the at least one secondary instrument by controlling the primary instrument.

It is yet another object of the disclosure to provide notification regarding sudden changes such as, but not limited to, temperature, pressure, current, voltage and volume experienced by the laboratory instrument.

It is yet another object of the disclosure to generate a notification to one or more users defined by the authorized user based on deviation from the user defined parameters or in case of non-compliance from standard usage instructions or defined parameters, wherein the user defined parameters are set by the authorized user.

To achieve these objects according to an aspect of the present disclosure, a novel method and system is devised for controlled usage of the laboratory.

This disclosure relates to a paperless monitoring of the laboratory instruments by the user of the computing device via a remote server. The remote server receives a connection request associated with a laboratory instrument from the computing device wherein the connection request includes a signaling identifier associated with the laboratory instrument. The signaling identifier comprises one or more of a pairing request, an identifier, a pairing code, a password, and an instrument id associated with the laboratory instrument. The remote server determines whether the user of the computing device is an authorized user. The user may be requested to transmit authentication credentials to the remote server for authentication. After the authentication is complete, the remote server transmits the signaling identifier to the laboratory instrument. The laboratory instrument transmits a response indicating the reception of the signaling identifier to the remote server. The remote server transmits the response received from the laboratory instrument to the computing device of the user and establishes a connection between the computing device and the laboratory instrument, if the response received is positive. In case the laboratory instrument transmits a negative response, the remote server transmits the response to the computing device of the user and requests the user to re-transmit the connection request. After the connection is established, the user sends a control instruction associated with the laboratory instrument to the remote server wherein the control instruction includes a control parameter associated with the laboratory instrument such as, but not limited to, name of the laboratory instrument, usage model of the laboratory instrument, start duration of the laboratory instrument, end duration of the laboratory instrument, life of the laboratory instrument, duration of use of the laboratory instrument, information of one or more users authorized for the usage of the laboratory instrument, experiments allowed to perform using the laboratory instrument, and chemical or vaccine to be used in the laboratory instrument. The remote server transmits the control instruction to the laboratory instrument and receives an acknowledgment from the laboratory instrument wherein the acknowledgment includes response associated with the installation of the control instructions by the laboratory instrument. The remote server transmits the received response to the computing device of the user. The remote server also stores the control instructions along with an identifier in the database of the remote server.

It is yet another object of the present disclosure to implement a method for updating the control instruction by the user of the computing device based on the received measurement data. The laboratory instrument sends the data associated with the experiment to the remote server. The remote server receives the measurement data associated with the laboratory instrument, wherein the measurement data includes one or more of the measurement parameters associated with the laboratory instrument. The laboratory instrument can transmit measurement data such as, but not limited to, experimental values generated by the laboratory instrument, error/mishap information, security breach information, or the like. The remote server transmits the received measurement data to the computing device, wherein the remote server stores the transmitted data along with an identifier in the database of the remote server. The remote server receives the updated control instructions from the computing device and transmits the updated control instructions to the laboratory instrument, wherein the updated control instructions along with the identifier is stored in the database of the remote server. In an embodiment, the remote server stores the updated control instruction as a separate version in the database of the remote server. The different versions (ongoing as well as old versions) of the control instruction reflects the modifications performed in the experiment process over a period of time. The different versions can be downloaded separately or can be accessed by the authorized users. The updated control instructions comprise at least one of name of the laboratory instrument, chemical or vaccine to be added to the laboratory instrument, start time of the experiment, end duration of the experiment, users authorized for the usage of the laboratory instrument, and experiments allowed to perform using the laboratory instrument.

It is yet another object of the present disclosure to remotely control a batch of laboratory instruments by the computing device. The computing device transmits a request to group one or more laboratory instruments, wherein the request include identifiers of the laboratory instruments to be grouped, wherein the request received from the computing device includes a relation instruction comprising information related to identifier of at least one of the laboratory instrument to be designated as a primary instrument and remaining laboratory instruments or subset of the remaining laboratory instruments as the secondary instruments. The remote server transmits the request received from the computing device to the one or more laboratory instruments identified in the group request. Before transmitting the group request to the laboratory instruments, the remote server determines whether the user of the computing device is an authorized user. The remote server receives response from the one or more laboratory instruments, wherein the response includes acknowledgment from the one or more laboratory instruments. The laboratory instruments can transmit a positive acknowledgment or a negative acknowledgment. The remote server transmits the received acknowledgment (i.e., response) to the computing device wherein the remote server stores the identifiers of the one or more laboratory instruments along with a group name, wherein the group name is provided along with the group request by the computing device. The user can control the group of the laboratory instruments by sending the control instruction associated with the group of one or more laboratory instruments to the primary instrument. The primary instrument automatically transmits the control instructions to the secondary instruments. In an embodiment, the primary instrument and the secondary instruments can be located at the same location or at the different geographical locations. Therefore, the user can control the group of one or more laboratory instruments using a single primary instrument, i.e., the primary instrument.

These and other embodiments which characterize the disclosure are pointed out with particularity in the claims annexed hereto and forming a part hereof. However, for further understanding of the disclosure, its advantages and objectives obtained by its use, reference should be made to the drawings which forms a further part hereof and the accompanying descriptive matter, in which there is illustrated and described embodiments of the disclosure.

BRIEF DESCRIPTION OF DRAWING

Embodiments of the present disclosure are best understood by reference to the figures and description set forth herein. All the aspects of the embodiments described herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, without departing from the spirit and scope thereof, and the embodiments herein include all such modifications.

DETAILED DESCRIPTION OF THE DRAWINGS

Embodiments of the present disclosure are best understood by reference to the figures and description set forth herein. All the aspects of the embodiments described herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit and scope thereof, and the embodiments herein include all such modifications.

Figure 1:
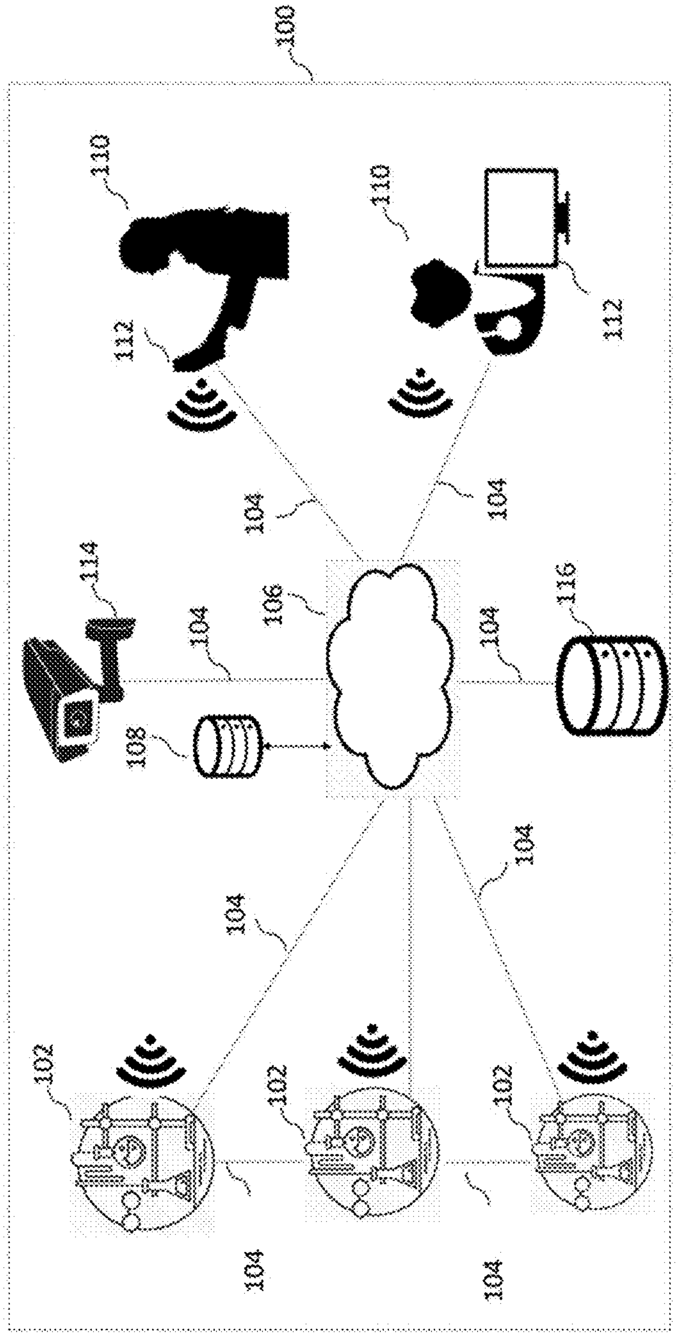
FIG. 1 illustrates an exemplary system for paperless monitoring of laboratory instruments 102, in accordance with first embodiment of the present disclosure.

FIG. 1 discloses an exemplary system 100 for paperless monitoring of laboratory instruments, in accordance with first embodiment of the present disclosure. The system 100 comprises one or more computing devices 112, one or more laboratory instruments 102 each provided with wired and/or wireless communication capabilities, and a remote server 106 communicatively coupled to the computing device 112. Further, the computing device 112 and the remote server 106 are connected to each other through a communication link 104. The system 100 also includes a surveillance element 114 and a storage element 116 coupled to the remote server 106 using the communication link 104. The system 100 may be operated by one or more authorized users 110.

It is an object of the disclosure to monitor and provide one or more authorized users 110 information related to the laboratory instruments 102 over their computing devices 112 wherein the information may include information associated with the control instructions provided by the authorized user 110. The authorized user 110 may define control instructions for each laboratory instrument 102. For example, the control instructions comprises such as, and without limitation, name of the laboratory instrument 102, model number of the laboratory instrument 102, start/end duration of the laboratory instrument 102, life of the laboratory instrument 102, duration of per day use of the laboratory instrument 102, users authorized for the usage of the laboratory instrument 102, experiments allowed to be performed using the laboratory instrument 102, chemical or vaccine to be used in the laboratory instrument 102, group name of the laboratory instrument 102, experiment input and output, standard operating instructions for the laboratory instrument 102, suggestions/comments provided by the persons performing the experiment. It is another main object of the disclosure, to allow an authorized user 110 to define groups or batches of the laboratory instruments 102 wherein the groups/batches help the authorized user 110 to control multiple laboratory instruments 102 from a remote location without departing from the standard control instructions defined thereof.

It is another primary object of the present disclosure to allow the authorized user 110 to create a group of one or more laboratory instruments 102. The authorized user 110 may designate a laboratory instrument 102 as a primary instrument from the group of one or more of the laboratory instruments 102. Also, the authorized user 110 can designate the remaining laboratory instrument 102 from the group of the one or more of the laboratory instrument 102 as secondary instruments. The authorized user 110 can send a control command to the primary instrument which can reciprocate the control command to the secondary instruments of the authorized user 110 created group of the one or more of the laboratory instruments 102. In another embodiment of the present disclosure, the user 110 can designate a subset or some of the remaining laboratory instruments 102 as the secondary instruments.

The aforementioned objects of the present disclosure are achieved by providing wireless transmission capabilities to the laboratory instrument 102. According to a preferred embodiment of the present disclosure, the laboratory instrument 102 is provided with Wi-Fi transmission capabilities. According to another embodiment of the present disclosure, the laboratory instrument 102 can be provided with other transmission capabilities such as, but not limited to, Bluetooth, NFC, radio broadcast (RF), infrared (IR), satellite, microwave, cellular, GPS, Zigbee transmission capabilities etc. According to yet another embodiment of the present disclosure, the laboratory instrument 102 can be provided with the wired transmission capabilities, such as, but not limited to, ethernet, PSTN, fiber optical cables, and waveguides. The wired transmission capability can be present in addition to the wireless transmission capability or exclusively. It is to be noted that the laboratory instrument 102 may be configured to have any and all types of communication technologies currently available and/or which may be available in the future. The laboratory instrument 102 can also be provided with additional features such as, but not limited to, voice recognition, display, an alert module, an input/output interface, power on/off button etc.

According to another object of the present disclosure, the plurality of laboratory instruments 102 can be connected to each other through communication link 104. The laboratory instruments 102 can be connected to each other to function as a group/batch as per the user's requirement. For example, in case the authorized user 110 wish to execute similar control instructions for the plurality of laboratory instruments 102. The authorized user 110 may group the one or more laboratory instruments 102 together and control multiple laboratory instruments 102 at a single time. In such scenario, the laboratory instruments 102 may be connected to each other.

In another embodiment of the present disclosure, the laboratory instrument 102 may function as a separate device. Each laboratory instrument 102 may perform distinct experiments according to the control instructions given by the authorized user 110. In such case, the laboratory instrument 102 may act as separate functional devices and may not require to be connected with each other.

The laboratory instrument 102 can communicate with the computing device 112 of the authorized user 110 using the remote server 106. The laboratory instrument 102 can communicate with the remote server 106 and the authorized user 110 using a communication link 104 wherein the communication link 104 can be such as, but not limited to, Wi-Fi, cellular network, Local Area Network (LAN), Wide Area Network (WAN), Metropolitan Area Network (MAN), PSTN, internet, GPRS, GSM, CDMA network, Ethernet, fiber optics, Bluetooth, Zigbee, NFC and so forth. It is to be noted that the communication link 104 may be configured to use any and all types of communication technologies currently available and/or which may be available in the future.

According to one embodiment of the present disclosure, the remote server 106 serves as a communication medium between the laboratory instrument 102 and the authorized user 110. The remote server 106 refers to a server which is configured to store information related to the plurality of laboratory instruments 102 and maintain the information related to the control usage instructions, usage of the plurality of laboratory instruments 102, and the group information associated with the laboratory instruments 102. The remote server 106 enables the real-time exchange of information between the laboratory instrument 102 and the authorized user 110, wherein the real-time information may include such as, but not limited to, progress of the control instructions, experiment, information about the experiment performed, researchers/technicians involved, errors/problems faced during the experiment, potentially dangerous materials/chemicals in the experiment, output of the experiment, control information for the group of laboratory instrument 102 and also ensure the effective monitoring of the laboratory instrument 102 by the computing devices 112. The remote server 106 further comprises a database 108 configured to store one or more of the control instructions associated with the laboratory instrument 102, and status of the experiments performed by the laboratory instrument 102. In an embodiment of the present disclosure, the database 108 is an integral part of the remote server 106. In another embodiment of the present disclosure, the database 108 can be located external to the remote server 106.

The remote server 106 is suitably designed and configured to implement the paperless monitoring of the laboratory instrument 102. The remote server 106 receives the connection request from the user 110 of the computing device 112, wherein the connection request includes a signaling identifier associated with the laboratory instrument 102, wherein the signaling identifier comprises one or more of a pairing request, an identifier, a pairing code, a password, and an instrument id associated with the laboratory instrument. The remote server 106 transmits the connection request to the laboratory instrument 102 identified in the connection request sent by the user 110 of the computing device 112. Based on the response received by the remote server 106 from the laboratory instrument 102, the remote server 106 forwards the response to the laboratory instrument 102. In an embodiment of the present disclosure, the response received may be positive i.e., the laboratory instrument 102 may recognize the signaling identifier embedded in the connection request. In another embodiment of the present disclosure, the response received may be negative i.e., the laboratory instrument 102 may not recognize the signaling identifier embedded in the connection request. The remote server 106 may signal the user 110 of the computing device 112 to re-transmit the connection request in case of reception of the negative response. The laboratory instrument 102 can also reject the connection request due to some conditions. These conditions are such as, but not limited to, the laboratory instrument 102 being locked, the laboratory instrument being already in use for some other experiment, insufficient authorization from the user 110 and the laboratory instrument being in damaged state. In an alternate scenario, if the response received is affirmative i.e., positive, the remote server 106 may establish the connection between the laboratory instrument 102 and the user 110 of the computing device 112.

According to an aspect of the disclosure, the remote server 106 may verify the identity of the user 110 before transmitting the signaling identifier embedded in the connection request to the laboratory instrument 102. The computing device 112 of the user 110 may be programmed to transmit authentication credentials to the remote server 106 to authenticate the user 110.

In response to transmission, the remote server 106 may query one or more authentication sources (not shown) for information indicating the identity of the user 110. In other embodiments, authentication sources may comprise databases storing login credentials, biometric signatures, smartcard data and/or the like. According to another embodiment, authentication sources may comprise any one of several commercially available authentication services. However, these are merely examples of authentication sources comprising information that may be used to verify an identity of a user and claimed subject matter is not limited in these respects.

In some exemplary embodiments, the users 110 can be authenticated using any one of several methods such as, but not limited to, comparing an individual's physical appearance with a government issued picture identification document, comparing a username and password entered in a computer system to pre-stored information, comparing provided information with unique known identification information, comparing information from a portable electronic device to a known sequence of numbers, and/or comparing a biometric specimen (fingerprints, retina, etc.) and/or sample with a biometric signature. However, these are merely examples of methods that may be used for authentication and claimed subject matter is not limited in these respects.

Once the user 110 is found to be successfully authenticated, the remote server 106 transmits the connection request to the laboratory instrument 102 and receives a corresponding response as explained in the above paragraphs. After the connection is established between the authorized user 110 and the laboratory instrument 102, the authorized user 110 sends the control instructions associated with the laboratory instrument 102 to the remote server 106. The remote server 106 checks if the user 110 has already registered the control instructions for the laboratory instrument 102. If the control instructions are already registered, the remote server 106 requests the authorized user 110 to overwrite/update the control instructions. Further, if the control instructions are not registered for the laboratory instrument 102, the remote server 106 send the control instructions to the laboratory instrument 102. The control instructions, can include control parameters such as, but not limited to, name of the laboratory instrument 102, model of the laboratory instrument 102, start/end duration of the laboratory instrument 102, life of the laboratory instrument 102, duration of use of the laboratory instrument 102, information of one or more users authorized for the usage of the laboratory instrument 102, experiments allowed to perform using the laboratory instrument 102, chemical or vaccine to be used in the laboratory instrument 102, forbidden chemical details not to be used in the laboratory instrument 102, comments/notes from the authorized user 110, or the like.

In some embodiments, the laboratory instrument 102 may include one or more operating sensors (not shown) for operation. Some non-limiting examples of the one or more operating sensors may be a voice sensor, a retina sensor, a gesture sensor, and the like. For instance, an experiment may be initiated using a voice command given by an operator. Other parameters such as, a temperature, a speed of rotation, or the like may be controlled by the voice sensor. In another example, a specific gesture may be used to initiate or to control the experiment. The gesture in such embodiment may be one or more hand gestures for performing different tasks related to the experiment. It is to be noted that some or all of the one or more operating sensors, for instance a face recognizer, a voice sensor, a retina sensor, may be used to authenticate a user or an operator who is operating the laboratory instrument 102. In such embodiment, the laboratory instrument 102 may have a user interface which facilitates accommodation of some or all of the one or more operating sensors.

The laboratory instrument 102 may further include one or more measurement sensors (not shown). The one or more measurement sensors may be configured to measure one or more measurement parameters associated with the laboratory instrument 102, one or more laboratory glassware, or surrounding parameters. Some non-limiting examples of the one or more measurement sensors include a pH meter, a weight sensor or a weighing balance, a temperature sensor, an odor sensor, a color sensor, and the like. For example, a pH meter may measure a pH of the fluid within a glassware used with the laboratory instrument 102. In another example, a temperature sensor may be configured to measure a temperature of the laboratory instrument 102, the glassware, or the surrounding environment. If there is a high temperature in surrounding area of the laboratory instrument 102, for example in case of fire, the temperature sensor may sense the rise in the temperature and may send a corresponding signal to a processing unit of the laboratory instrument 102 or to the remote server 106 using the communication link 104. In such case, a corresponding alert may be generated as a warning sign to alert the operator.

It is to be noted that the one or more operating sensors and one or more measurement sensors may be configured to use any and all types of corresponding sensors currently available and/or which may be available in the future.

According to one embodiment of the present disclosure, the remote sever 106 may also store the control instructions along with an identifier associated with the laboratory instrument 102 in the database 108. The identifier represents the identity of the laboratory instrument 102 in the remote server 106 along with the control instructions associated with the laboratory instrument 102 which are stored in the form of a machine-readable language. The identifier also helps to keep record of the progress updates received from the laboratory instrument 102. For example, the identifier can be used to store updated control instructions received from the authorized user 110, generate different versions of the control instructions associated with the laboratory instrument 102, transmit a report related to the laboratory instrument 102 to users other than the authorized user 110, date and time of each experiment performed using the laboratory instrument 102, experiment details, details of the person who performed the experiment, chemicals used in the glassware used along with the laboratory instrument, operating conditions related to the experiments, experiment duration, experiment output, issues faced, and/or any other comments/notes related to the past experiments performed using the laboratory instrument or using glassware along with the laboratory instrument. The information is stored in the remote server 106 in an encrypted format.

According to another embodiment of the present disclosure, the remote server 106 also receives a response from the laboratory instrument 102 indicating the installation of the control instructions associated with the laboratory instrument 102 (i.e., acknowledgment of configuration of the control instructions in the laboratory instrument 102). In yet another embodiment of the present disclosure, the remote server 106 can transmit the response received from the laboratory instrument 102 to the authorized user 110.

According to another embodiment of the present disclosure, the remote server 106 also receives a request to group one or more of the laboratory instruments 102. The request may include a relationship instruction associated with the one or more laboratory instruments 102. The relationship instruction may include instructions related to identifier of the laboratory instrument 102 to be designated as a primary instrument. The relationship instruction may also include identifiers of the laboratory instrument 102 to be designated as secondary instruments. The remote server 106 may transmit the group request to the one or more of the laboratory instruments 102 identified in the request. Also, the remote server 106 may receive response from the one or more of the laboratory instruments 102. The response may indicate the identifiers of the one or more of the laboratory instruments 102 along with an acknowledgment indicating that the request instruction has been installed in the laboratory instrument 102. The remote server 106 may transmit the received response to the computing device 112. The remote server 106 may also store the received identifiers associated with the one or more laboratory instruments 102 in the database 108. The remote server 106 also updates the stored identifier associated with the laboratory instruments 102. The update includes updating the status of the laboratory instruments 102 as the primary or the secondary instruments according to the response received from the one or more of the laboratory instruments 102.

According to an embodiment of the present disclosure, the primary instrument and the secondary instrument may be located at the same place. According to another embodiment of the present disclosure, the primary instrument and the secondary instrument may be located at different geographical locations.

According to yet another embodiment of the present disclosure, the user 110 of the computing device 112 may send the control instruction to the primary instrument. The primary instrument may automatically transmit the control instruction to the secondary instruments. Thereby, allowing the user 110 to efficiently control a batch of laboratory instruments 102.

According to an embodiment, many changes and modifications may be made within the scope of the embodiments herein, without departing from the spirit and scope thereof, and the embodiments herein include all such modifications. For example, functionalities performed by the remote server 106 related to the monitoring of the laboratory instrument 102 can be implemented by using a suitable computer program product which is executed by the processing unit (not shown) of the computing device 112 to perform various actions related to remote monitoring of the laboratory instrument 102. According to this particular embodiment, the functionalities of remote server 106 and the database 108 can be executed by the computing devices 112 using their processing units (not shown) and the internal storage memory (not shown).

The computing devices 112 of the authorized user 110 may include an application program to communicate with the remote server 106 and the laboratory instrument 102. According to an embodiment of the present disclosure, the authorized user 110, can use a pre-installed software associated with the laboratory instrument 102 to formulate the control instructions associated with the laboratory instrument 102. The authorized user 110 can use the default instructions associated with the laboratory instrument 102. According to another embodiment of the present disclosure, the authorized user 110 can customize the control instructions associated with the laboratory instrument 102 according to the user's requirement.

In one embodiment of the present disclosure, the application program is downloaded from the internet and installed on the computing device 112. In another embodiment of the present disclosure, the application program is pre-installed or in-built in the computing device 112. In yet another embodiment of the present disclosure, the authorized user 110 can visit a website/webpage using a browser application running on the computing device 112 to formulate the control instructions associated with the laboratory instrument 102. The website/webpage can be hosted on the remote server 106 or a third party web-server. Further, the website/webpage can facilitate the remote monitoring and control of the laboratory instrument 112.

Further, the computing device(s) 112 refers to a device which is used by the user(s) 110 to remotely monitor the laboratory instrument 102. The user 110 can be such as, but not limited to, a technician, a lab operator, a scientist, a researcher, a technologist, an examiner, a chemical expert, etc. The computing devices 112 can be such as, but not limited to, a smart phone, a hand-held phone, a personal digital assistant (PDA), a tablet computer, a desktop computer, a portable scanner, a laptop computer, a smart watch, a wearable device or other similar device without departing from the spirit and scope of the present disclosure.

According to another aspect of the present disclosure, the remote server 106 may also be in communication with at least one surveillance element 114 and the storage element 116 connected using the communication link 104. In one embodiment of the present disclosure, the surveillance element 114 may be such as but not limited to, a camera, a video recorder, a CCTV module, an image recorder, a camcorder, infrared camera, spectroscopic camera, night vision camera, ultraviolet camera, pressure transducer, thermocouple, voltmeter, ampere meter or the like. The surveillance element 114 may continuously record the experiment performed by the laboratory instrument 102. The surveillance element 114 may also help to monitor the security of the area where the laboratory instrument 102 is placed. It may help to find out the reason for any mishap, or breakdown or damage to the laboratory instrument 102. The recordings generated by the surveillance element 114 may be sent to the remote server 106. The remote server 106 may store the recording along with the identifier of the laboratory instrument 102 in the database 108 of the remote server 106. The remote server 106 may send the recording to the user 110 of the computing device 112, in case the user 110 requests to access the recording.

According to another different aspect of the present disclosure, the remote server 106 may also be in connection with the storage element 116. In one preferred embodiment of the disclosure, the storage element 116 may be a portable storage element (e.g., a pen drive). In one another embodiment of the disclosure, the storage element 116 may be a memory card, a USB device, a card reader, a compact disc (CD), a hard disk, a memory stick, a floppy disk, a magnetic storage, a flash drive, a solid state memory device or any other similar storage device.

The storage element 116 may act as an in-house data storage device. The storage element 116 may also be provided with additional security elements, such as digital signatures, face recognition, eye scan, encryption techniques, etc.

According to one embodiment of the present disclosure, the identity of the storage element 116 may be stored in the database 108 of the remote server 106. Whenever the storage element 116 is connected with the laboratory instrument 102, the remote server 106 may verify the storage element 116 by comparing it with the identity stored in the database 108. If the server identifies the storage element 116 in the database 108, the remote server 106 allows the storage element 116 to transfer information associated with the laboratory instrument 106. The remote server 106 may also transmit a notification to the user 110 regarding the data transfer using the storage element 116.

More details on the functioning of the laboratory instrument 102, the remote server 106 and the computing device 112 are provided further in conjunction with FIGS. 2-9 of the present disclosure.

Figure 2:
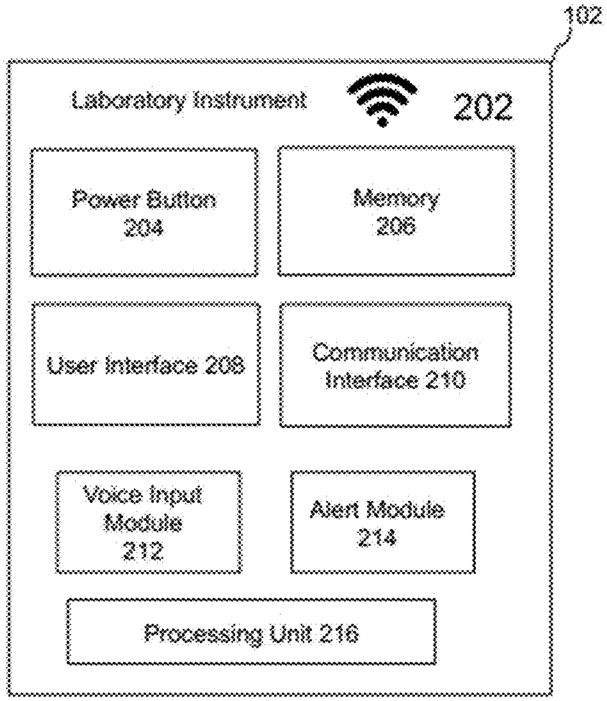
FIG. 2 shows a block diagram of the laboratory instrument, in accordance with a preferred embodiment of the present disclosure.

FIG. 2 shows a block diagram of the laboratory instrument 102, in accordance with a preferred embodiment of the present disclosure. The laboratory instrument 102 is provided with wireless transmission capabilities using a network interface 202. According to preferred embodiment of the present disclosure, the laboratory instrument 102 is Wi-Fi enabled. According to another embodiment of the present disclosure, the laboratory instrument 102 can be provided with other transmission capabilities such as, but not limited to, Bluetooth, NFC, radio broadcast (RF), infrared (IR), satellite, microwave, cellular, GPS, Zigbee transmission capabilities etc. According to yet another embodiment of the present disclosure, the laboratory instrument 102 can be provided with the wired transmission capabilities, such as, but not limited to, ethernet, PSTN, fiber optical cables, and waveguides. The wired transmission capabilities can be present in addition to the wireless transmission capabilities or exclusively. The laboratory instrument 102 also comprises a power button 204 configured to provide power to the laboratory instrument 102. The laboratory instrument 102 may be powered on/off according to the user 110 requirement.

Further, the laboratory instrument 102 comprises a memory 206 which stores instructions related to the laboratory instrument 102. The instructions may be programmed in the laboratory instrument 102 by the user 110 via the remote server 106. The user 110 may use the computing device 112 to communicate with the laboratory instrument 102 via the remote server 106. The remote server 106 may transmit instructions to the laboratory instrument 102 which may include, but not limited to, name of the laboratory instrument 102, model of the laboratory instrument 102, start/end duration of the laboratory instrument 102, life of the laboratory instrument 102, duration of use of the laboratory instrument 102, users authorized for the usage of the laboratory instrument 102, experiments allowed to perform using the laboratory instrument 102, chemical or vaccine to be used in the laboratory instrument 102, forbidden chemical details not to be used in the laboratory instrument 102, comments/notes from the authorized user 110, or the like. In one embodiment of the present disclosure, the memory 206 may also store information related to group instructions. The group instructions may include the group name, the identifiers to the laboratory instruments 102 assigned to the group.

In one another embodiment of the present disclosure, the memory 206 also stores instructions related to the application program. The application program may be used to operate the laboratory instrument 102. The application program can be operated in multiple languages. In one embodiment of the present disclosure, the application program is downloaded from the internet and installed on the laboratory instrument 102. In another embodiment of the present disclosure, the application program is pre-installed or in-built in the laboratory instrument 102.

In an exemplary embodiment of the present disclosure, the laboratory instrument 102 is installed with a service application (not shown). In an embodiment of the present disclosure, the service application may be implemented as an application program (or combination of software and hardware). Further, the service application installed in the laboratory instrument 102 is configured to connect the laboratory instrument 102 with the user 110 via the remote server 106.

The laboratory instrument 102 also includes a processing unit 216. The processing unit 216 interacts with the memory 206 to execute the instructions stored on the memory 206 to run the application program such as software application, website or desktop software, web-browser etc. The processing unit 216 also interacts with the memory 206 to execute the instructions received from the user 110 via the remote server 106.

The laboratory instrument 102 comprises of a communication interface 210 for performing communication with other laboratory instruments 102, the computing device 112 of the user 110 and the remote server 106. The communication interface 210 can be, but not limited to, Ethernet port, Bluetooth, WiFi, LAN interface, NFC, Zigbee, Infrared port, cellular interface, radio interface, fiber optic port, USB port, IEEE compliant interface or any other method known in the prior art.

According to one embodiment of the present disclosure, the laboratory instrument 102 comprises of a user interface 208 as shown in FIG. 2. The user interface 208 can be any interface known in the art, such as, Graphical User interface (e.g., LCD, LED display, etc.), touchscreen, keyboard, mouse, keypad and combination thereof. In an embodiment of the present disclosure, the user interface 208 can be used to display the output of the experiment. In another embodiment of the present disclosure, the user interface 208 can also be used to receive input from the user 110, if the user 110 is physically present near the laboratory instrument 102.

The laboratory instrument 102 can also include a voice input module 212. The voice input module 212 can be used to allow the user 110 to input voice instructions instead of touch input to operate the laboratory instrument 102. The laboratory instrument 102 having touch interface may impose a threat on the user 110 if the user 110 is engaged in an experiment related to a communicable disease. Therefore, the voice module 212 can be provided to enhance the security of the user 110.

The laboratory instrument 102 can also be provided with an alert module 214. The alert module 214 may be used to notify the user 110 if there is a sudden change in the laboratory instrument 102. The laboratory instrument 102 can notify changes such as, but not limited to, sudden change in the temperature, pressure, current, voltage, humidity, volume, weight or fire, smoke, foul smell, viscosity detected by the laboratory instrument 102. In an embodiment of the present disclosure, the user 110 may program the laboratory instrument 102 to alert when these parameters exceed a certain value. In another embodiment of the present disclosure, the user 110 may also specify the alert type and the users who will be notified in case of an emergency. In other embodiment, alert module may use artificial intelligence (AI) to alert the user 110. The use of AI within the alert module can specify the different alert types and responses based on sudden changes in the laboratory instrument 102. In one embodiment of the present disclosure, the alert type can be an audio alert, a visual alert or the like.

According to another different embodiment of the present disclosure, the laboratory instrument 102 can be solar powered. The power received from solar energy sources can be used to run the laboratory instrument 102. In an embodiment, the laboratory instrument 102 may be provided with solar panels, solar cells, photovoltaic (PV) panels in order to make the laboratory instrument 102 solar power compatible.

According to yet another different embodiment of the present disclosure, the laboratory instrument 102 may act as a hybrid instrument i.e., the motion generated from the laboratory instrument 102 may be used to generate power for the laboratory instrument 102. In an embodiment, the laboratory instrument 102 may be provided with a motion generator and a power generator to regenerate the power generated from the motion of the laboratory instrument 102. This approach makes the laboratory instrument 102 more efficient and economical in comparison to the existing prior art instruments.

Figure 3:
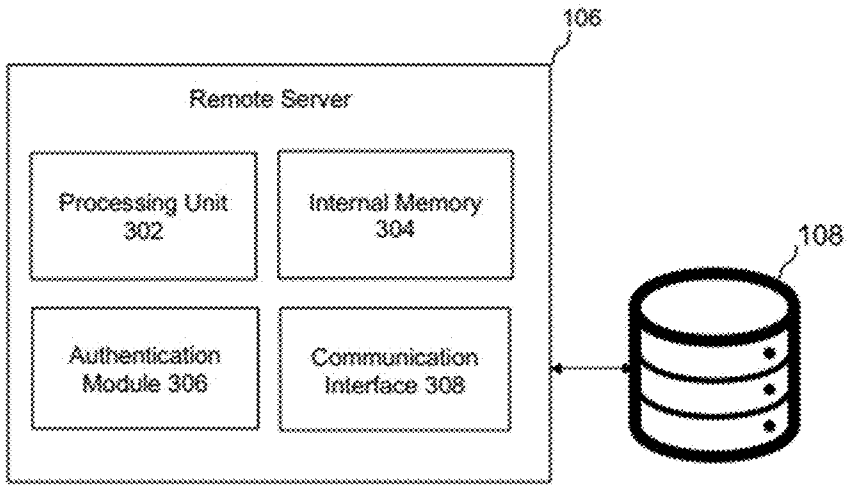
FIG. 3 shows an exemplary block diagram of the remote server, which can be implemented in various embodiments of the present disclosure.

FIG. 3 shows an exemplary block diagram of the remote server 106 which can be implemented in various embodiments of the present disclosure. The remote server 106 comprises a processing unit 302 for performing various functions of the remote server 106. The remote server 106 further comprises an internal memory 304 which stores a suitably programmed computer program product which when executed by the processing unit 302 performs the various controlled usage related functionalities of the remote server 106. The remote server 106 further comprises a communication interface 308 and is communicatively coupled to the computing device 112 and the laboratory instrument 102 via communication link 104, wherein the communication link 104 can be such as, but not limited to, Wi-Fi, cellular network, Local Area Network (LAN), Wide Area Network (WAN), Metropolitan Area Network (MAN), PSTN, internet, GPRS, GSM, CDMA network, LTE, Ethernet, fiber optics, Bluetooth, NFC, Zigbee and so forth. It is to be noted that the communication link 104 may be configured to use any and all types of communication technologies currently available and/or which may be available in the future.

Further the remote server 106 comprises an authentication module 306 for performing authentication of the authorized user 110. Here, for example, the application program running on the computing device 112 of the user 110 may request the authentication module 306 of the remote server 106 to authenticate the user 110. In response to such a request, the authentication module 306 of the remote server 106 may query one or more authentication sources (not shown) for information indicating the identity of the user 110. In one embodiment, authentication sources may comprise any one of several commercially available authentication services. In other embodiments, authentication sources may comprise databases storing biometric signatures, smart-card data and/or the like. However, these are merely examples of authentication sources comprising information that may be used to verify an identity of a user and claimed subject matter is not limited in these respects.

Based, at least in part, on information from authentication sources and in response to the authentication request from the application program, the authentication module 306 of the remote server 106 may determine whether or not a user 110 can be authenticated successfully. Upon authenticating a user 110, remote server 106 may transmit a true response of this authentication of the user back to the application program.

Further, the remote server 106 comprises an AI module. In some embodiments, the AI module can monitor the laboratory instrument 102 for a sudden change in the laboratory instrument 102. The AI module can specify the different alert types and responses based on sudden changes in the laboratory instrument 102. In some embodiments, the remote server 106 may be configured to record a plurality of parameters along with an accuracy associated with each experiment from a plurality of experiments. In an embodiment, when the same experiment is being performed again, the AI module may extract the parameters associated with the experiment having the highest accuracy and may suggest the corresponding parameters to the user for performing the experiment. In another embodiment, the remote server 106 may transmit corresponding control instructions for operating the laboratory instrument 102 with the parameters associated with the experiment having the highest accuracy without human intervention.

Additionally, the AI module may generate an analytical report associated with each experiment being performed by or on the laboratory instrument 102. The analytical report may be an analytical comparative report. The analytical report, and hence the analytical comparative report, is generated without human intervention. In such embodiment, the AI module may identify if any or all of one or more parameters of a current experiment are out of corresponding predefined ranges. The analytical comparative report may be generated for each experiment being performed by or on the laboratory instrument. The analytical comparative report may be generated by processing the one or more parameters associated with each experiment to correctly define the experiment. Such report enhances accuracy and save valuable time and money. Such analytical report may be transmitted to a user interface using the communication link 104.

The laboratory instrument 102 can notify changes such as, but not limited to, sudden change in the temperature, pressure, current, voltage, humidity, volume, weight or fire, smoke, foul smell, viscosity detected by the laboratory instrument 102. In an embodiment, the remote server 106 may be configured to alert when these parameters exceed a certain value. In another embodiment, the remote server 106 may further generate an alert in case of generation of probable hazardous event. For instance, if the laboratory instrument 102 is being operated at a high temperature for a certain amount of time, the server 106 may generate an alert indicating of possible fire, smoke, or explosion based on a current parameters of the laboratory instrument 102. Such alert may provide an appropriate time to everyone, such as operators and other personnel, working in the vicinity of the instrument 102 to evacuate the vicinity, thereby preventing any injury or damage to the facility, institution, laboratory, and even different mediums or other chemicals. The alert type can be an audio alert, a visual alert, a combination thereof, or the like.

The remote server 106 also includes a database 108 which can be coupled with the remote server 106 or can be placed at a remote location. The database 108 placed at the remote location is in communication with the remote server 106 using industry standard communication means.

An identifier related to the laboratory instrument 102 is stored in the database 108, by the remote server 106, wherein the identifier comprises control instructions based on the authorized user's input (e.g. administrator's inputs) which consists of any number of fields indicating control instructions such as, but not limited to, information regarding name of the laboratory instrument 102, model of the laboratory instrument 102, start/end duration of the laboratory instrument 102, life of the laboratory instrument 102, duration of use of the laboratory instrument 102, users authorized for the usage of the laboratory instrument 102, experiments allowed to perform using the laboratory instrument 102, chemical or vaccine to be used in the laboratory instrument 102, forbidden chemical details not to be used in the laboratory instrument 102, comments/notes from the authorized user 110, or the like. In one embodiment of the present disclosure, the database 140 may also store information related to group instructions. The group instructions may include the group name, the identifiers to the laboratory instruments 102 assigned to the group.

The database 108 can also be linked with third-party servers. The users of the third-party servers can be provided with authentication credentials to access the database 108. Such approach is beneficial in scenarios where the laboratory instruments 102 are licensed to third party users. In an embodiment, the information stored in the database 108 (e.g., identifier corresponding to each laboratory instrument 102 including information related to the control instructions) is suitably encrypted to ensure protection to the information.

Figure 4:
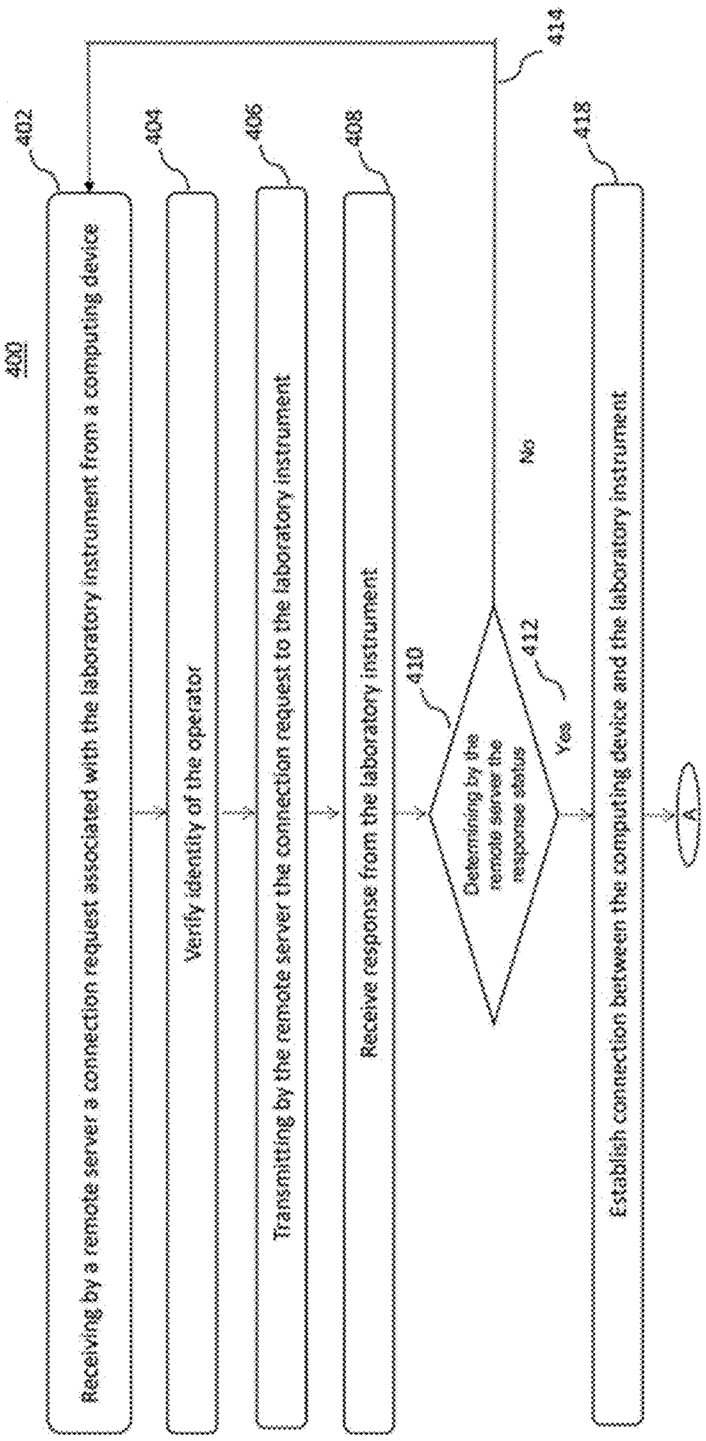
FIG. 4 shows the method for establishing a connection between the laboratory instrument and computing devices via the remote server, according to an embodiment of the present disclosure.

FIG. 4 shows the method 400 for establishing a connection between the laboratory instrument 102 and the computing devices 112 via the remote server 106, according to an embodiment of the present disclosure. In a particular embodiment, although the claimed subject matter is not limited in this respect, some portion of process embodiment 400 may be executed and/or performed by a suitably configured remote server 106 and/or a portion of process may be implemented by the computing device 112.

The process begins at step 402, wherein the remote server 106 is configured to receive a connection request associated with a laboratory instrument 102 from the computing device 112. The computing device 112 can be operated by a user 110. The computing device 112 and the remote server 106 communicates with each other using the communication link 104. The communication link 104 can be, but not limited to, Ethernet port, Bluetooth, Wi-Fi, LAN interface, NFC, Zigbee, Infrared port, cellular interface, radio interface, fiber optic port, USB port, IEEE compliant interface or any other method known in the prior art.

According to an embodiment, the computing device 112 is configured to run an application program which when executed by the processing unit (not shown) of the computing device 112 performs at least: generating a connection request associated with the laboratory instrument 102, transmitting the connection request to the remote server 106 using the communication link 104. The application program may facilitate the sending of the connection request in response to an event such as, for example, a selection from a user interface (not shown) of the computing device 112 by the user 110. However, this is merely an example of an event that may initiate the sending of the connection request and the claimed subject matter is not limited in these respects.

According to another embodiment, the computing device 112 is configured to send the connection request associated with the laboratory instrument 102 by visiting a website using a browser application installed on the computing device 112, wherein the website is hosted on the remote server 106 or a third party web-server, wherein the website is suitably configured to facilitate the sending of the connection request associated with the laboratory instrument 102 and transmission of the connection request thereof with the remote server 106.

At step 404, the remote server 106 is configured to verify the identity of the user 110 operating the computing device 112 before sending the connection request to the laboratory instrument 102 identified in the connection request. For example, the authentication module 306 of the remote server 106 may check if the user has completed the enrolling process of the application and is registered in the database 108. If the remote server 106 determines that the user 110 has not enrolled for using the application, the remote server 106 notifies the user 110 to complete the enrollment process and resend the connection request after the successful enrolment. In an alternate scenario, the remote server 106 determines that the user has already enrolled to use the application by receiving verification data related to the enrollment from the database 108 of the remote server 106. Then, the remote server 106 asks the user 110 to present authentication information provided by the remote server 110 at the time of the enrollment such as, for example, a user ID and a password to verify the identity of the user 110. In one embodiment, the remote server 106 may prompt or request the user 110 for the user information comprising credentials such as, for example the user ID and the password. Based on the received request, the user 110 of computing device 112 transmits the appropriate user information/credentials to the authentication module 306. Again, however, these are merely examples of user information that may be indicative of a user's identity and the claimed subject matter is not limited in these respects.

The remote server 106 will determine the authenticity of the user 110 using the authentication module 306. The database 108 of remote server 106 stores multiple entries of user's information templates and associated data values for different users 110. The remote server 106 compares the received user's information with pre-stored information of different authorized users. In other embodiments of the present disclosure, the authentication module 306 may obtain user information such as organization's biometric information database and compare the same with the user's biometric information. The remote server 106 may be configured to receive information from external sources as current usage related information, such as, and without limitation, information obtained from laboratory video feed, biometric information sources, and/or company attendance system, and compare that with the user's information to verify the authenticity of the user. Based on the comparison, the remote server 106 decides whether the user 110 is an authorized user or not. Based on the result, if the user 110 is not an authorized user, the remote server 106 may ask the user 110 to re-enter the authorized credentials or details. The remote server 106 can also give options to user 110 to update the credentials. These options can include forgotten password link. If the user 110 is an authorized user, then the process proceeds ahead to step 406.

At step 406, the remote server 106 is configured to transmit the connection request to the laboratory instruments 102 identified in the connection request wherein the connection request includes a signaling identifier associated with the laboratory instruments 102. The signaling identifier may include one or more of a pairing request, an identifier of the user 110, a pairing code, a password, and an instrument id associated with the laboratory instrument 102 or the like.

Once the signaling identifier is received by the laboratory instrument 102, the instrument 102 replies with an acknowledgment associated with the signaling identifier to the remote server 106. The acknowledgment represents the reception status of the signaling identifier by the laboratory instrument 102. The laboratory instrument 102 can transmit different states of the acknowledgment to the remote server 106 which can be, for example, a positive acknowledgment or a negative acknowledgment. The negative acknowledgment represents a state in which the laboratory instrument 102 does not recognize the identifier received in the signaling information, the laboratory instrument 102 is already in use for some other experiment, the user 110 has insufficient authorization to access the laboratory instrument 102, the laboratory instrument 102 is locked, the laboratory instrument 102 is disconnected or damaged and rejects the connection request. Whereas the positive acknowledgment represents the state where the laboratory instrument 102 recognizes the identifier received in the signaling information and accepts the connection request. The corresponding response is received by the remote server 106 at step 408.

At step 410, the remote server 106, determines the acknowledgment (i.e., response) status received from the laboratory instrument 102. If the laboratory instrument 102 has transmitted a negative acknowledgment (i.e., response), the control shifts to step 414 wherein the remote server 106 notifies the user 110 with the negative acknowledgment status and request the user 110 to re-send the connection request. In an alternate scenario, if the received acknowledgment (i.e., response) status is positive, the control shifts to step 412.

At step 412, the remote server 106 sends the acknowledgment (i.e., response) to the user 110 and at step 418, establishes a connection between the user 110 and the laboratory instrument 102. In an embodiment, the remote server 106 may also send the list of the laboratory instrument 102 with which the connection is established. The list may be represented in the form of a graph, a vein diagram, a pie chart, a bubble chart, or the like. The list may also include the status of the laboratory instrument 102 which can be but not limited to, idle, busy, occupied, online, offline, available, unavailable, connected, disconnected.

According to an embodiment of the present disclosure, after establishing the connection between the user 110 and the laboratory instrument 102, the remote server 106 may store the identifiers of the laboratory instrument 102 connected with the user 110 in the user's profile maintained in the database 108 of the remote server 106.

According to another embodiment of the present disclosure, although the claimed subject matters is not limited in this respect, all or a portion of process 400 may be executed on a computing device 112 platform (e.g., notebook computer, personal digital assistant, cell phone, and/or the like). In one particular embodiment, such a computing device platform may be capable of hosting "rich-client" applications that are hosted on the computing device 112 platform. Alternatively, the computing device 112 platform may enable a user 110 to interact with web applications through the communication interface.

Figure 5:
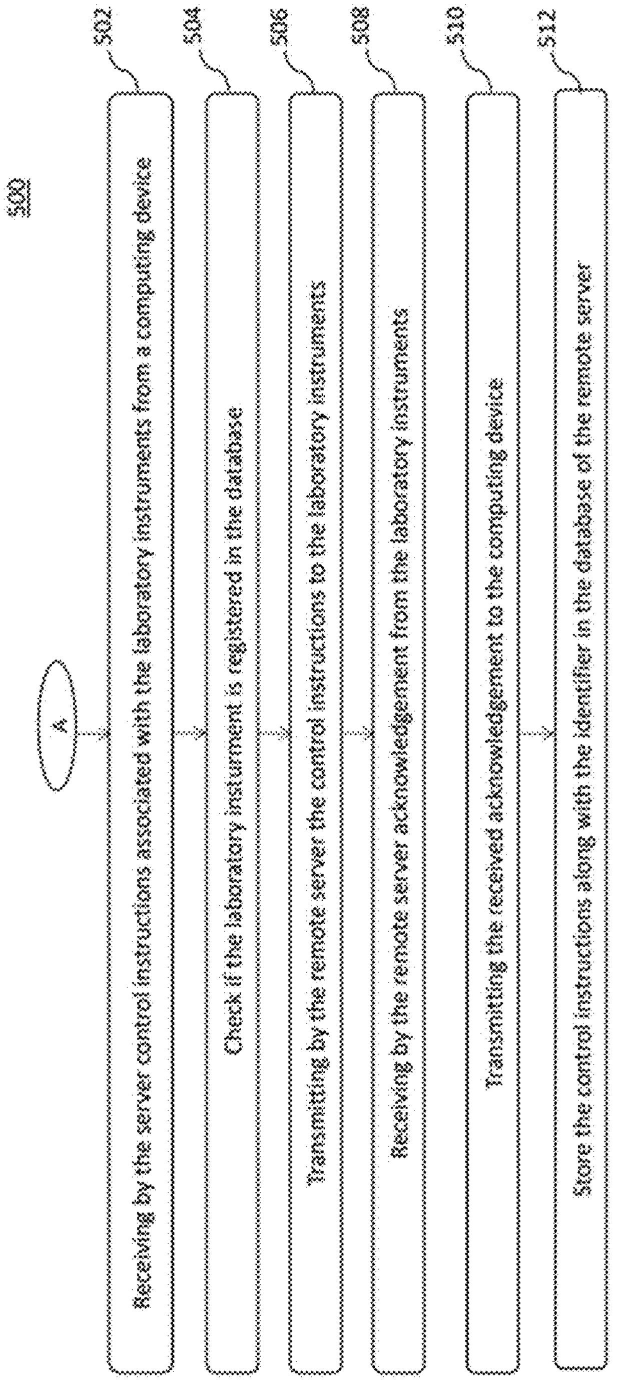
FIG. 5 shows a flowchart illustrating an exemplary workflow for enabling the user to remotely control the laboratory instrument via the remote server, according to an embodiment of the present disclosure.

The method for enabling the user 110 to remotely control the laboratory instrument 102 via the remote server 106 is illustrated by flowchart 500 of FIG. 5. The process begins at step 502, when the remote server 106 receives a control instruction associated with the laboratory instrument 102 from a user 110 of the computing device 112. The control instruction may include such as, but not limited to, name of the laboratory instrument 102, model number of the laboratory instrument 102, start/end duration of the laboratory instrument 102, life of the laboratory instrument 102, duration of per day use of the laboratory instrument 102, users authorized for the usage of the laboratory instrument 102, experiments allowed to be performed using the laboratory instrument 102, chemical or vaccine to be used in the laboratory instrument 102, group name of the laboratory instrument 102, experiment input and output, standard operating instructions for the laboratory instrument 102, suggestions/comments provided by the users performing the experiment, forbidden chemicals name, calibration of the laboratory instrument 102, chemical reactive properties of the laboratory instrument 102. In one embodiment of the present disclosure, the user 110 can send similar control instructions for one or more laboratory instruments 102. For example, if the one or more laboratory instruments 102 are engaged in a similar experiment and they are required to maintain similar operational settings during the experiment, the user 110 may send common control instructions for the one or more of the laboratory instruments 102. In another embodiment of the present disclosure, the user 110 may transmit unique control instruction for each of the laboratory instrument 102. For example, if the one or more laboratory instruments 102 are required to perform different experiments, they may require to maintain different operational settings. Therefore, in such case the user 110 may transmit different control instructions for each of the laboratory instruments 102.

At step 504, the remote server 106 checks if the laboratory instrument 102 is registered in the database 108. The remote server 106 may check this to ensure that the control instruction is being sent to the laboratory instruments 102 which are connected with the user 110 as described in step 418 of FIG. 4. If the remote server 106 determines that the laboratory instrument 102 is not registered in the database 108 of the remote server 106, the remote server may transmit a message to the user 110 to send a connection request for the said laboratory instrument 102. In an alternate scenario, if the remote server 106 determines that the laboratory instrument 102 is registered in the database 108 of the remote server 106, the process moves to step 506.

At step 506, the remote server 106 transmits the control instruction to laboratory instrument 102 identified in the control instruction. The control instructions serve as a medium to configure the laboratory instrument 102 according to the user 110 requirement without being located at the same place. This helps in reducing the need for manual operators, as a single user can program a plurality of laboratory instrument(s) 102 using the control instructions. In an embodiment, the user 110 may be either present at the same location, or located outside the area where the laboratory instrument 102 is placed. This can be beneficial if the experiment to be performed by the laboratory instrument 102 relates to harmful gases or communicable diseases or viruses. In such cases, the scientist in charge of the experiment is at a great risk of getting infected. Therefore, such arrangements increase the safety of the scientist without compromising on the quality of the experiment.

The laboratory instrument 102 may transmit a response indicating that the control instructions have been successfully installed or not. The laboratory instrument 102 may transmit different response according to different states for instance, the laboratory instrument 102 may transmit a negative response if the control instructions are not installed by the laboratory instrument 102 due to different reasons such as, but not limited to, connection break, error in reception of the control instruction, damage to the laboratory instrument 102 or the like. In another different scenario, if the laboratory instrument 102 has successfully installed the control instruction, the laboratory instrument 102 transmits a positive response to the remote server 106.

At step 508, the remote server 106 receives the response from the laboratory instrument 102 and transmits the received response to the user 110 at step 510. If the response received from the laboratory instrument 102 is positive, the remote server 106 may transmit the response in the form of a list of the laboratory instrument 102 who have configured the control instructions. The laboratory instrument 102 may be displayed along with their availability status such as, but not limited to, available, idle, busy, disconnected or the like.

At step 512, the remote server 106 may store the control instructions along with the identifier of the laboratory instrument 102 in the database 108. The remote server 106 stores the control instructions to keep a record of the communications associated with the laboratory instrument 102. This approach also helps sending the control instruction to other computing devices (not shown) on the user's request. The user 110 may wish to share the control instruction associated with the laboratory instrument 102 with other people working on the same experiment performed by the laboratory instrument 102. The laboratory instrument 102 may be required to be re-programmed using the control instructions based on the inputs provided by the users of the other computing devices. In an embodiment, the control instruction stored in the database 108 of the remote server 106 may be transmitted in the form of an e-mail or message as specified by the user 110. In another embodiment of the present disclosure, the control instructions may be downloaded directly to the user 110 or the users of other computing devices. The user 110 can update the control instruction based on different parameters such as, but not limited to, progress of the experiment, inputs from other users, variation in working environment of the laboratory instrument 102 or the like. The detailed process is illustrated in the FIG. 6 of the present disclosure.

According to another embodiment of the present disclosure, the steps 506 and 512 can be performed in any order, depending on the implementation of the process. For example, the remote server 106 may store the instructions along with the identifier of the laboratory instrument 102 in the database 108 of the remote server 106 prior to transmission of the control instructions to the laboratory instrument 102. Therefore, the steps are interchangeable and are not intended to limit the scope of the disclosure.

Figure 6:
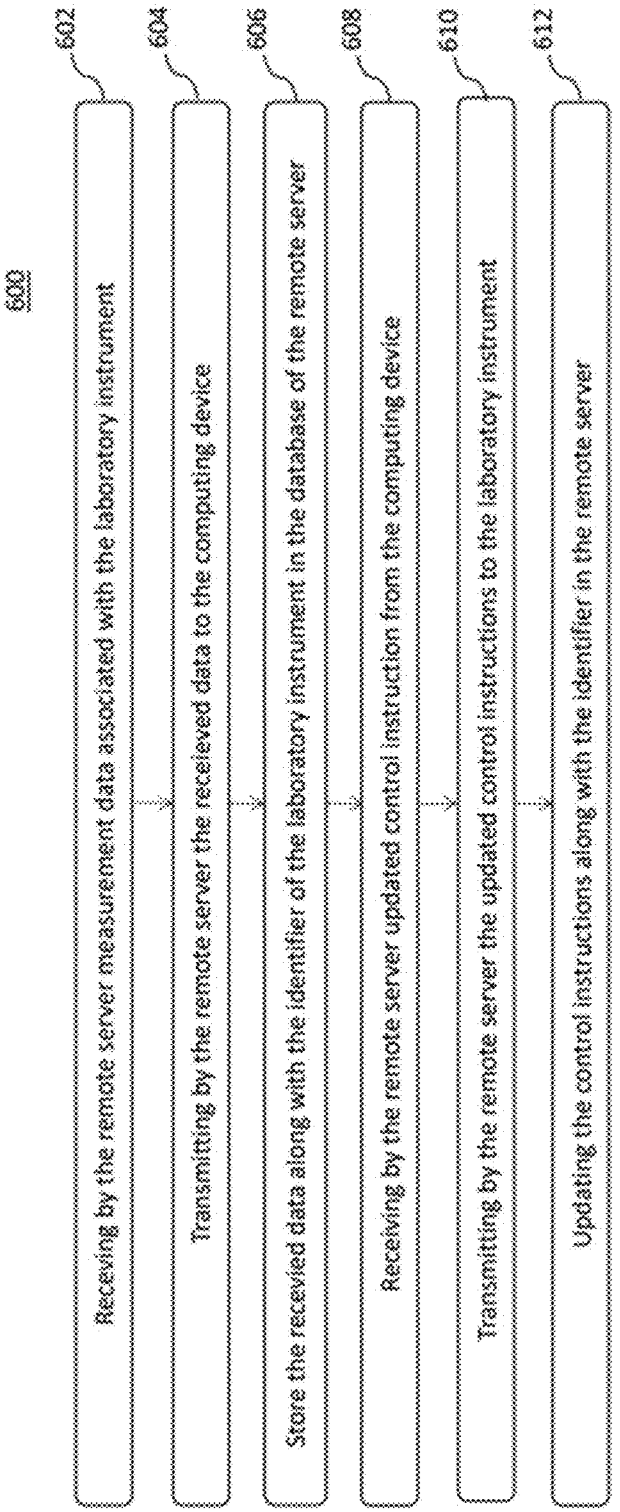
FIG. 6 shows a flowchart illustrating an exemplary workflow for updating control instructions by the user of the computing device via the remote server according to an embodiment of the present disclosure.

The method for updating control instructions by the user 110 of the computing device 112 via the remote server 106 is illustrated by flowchart 600 of FIG. 6. The process begins at step 602, when the remote server 106 receives measurement data associated with the laboratory instrument 102. The laboratory instrument 102 may transmit measurement data related to different measurement parameters such as, but not limited to, experimental values generated by the laboratory instrument 102, error/mishap information, security breach information, or the like. In one embodiment, the user 110 may define the duration after which the laboratory instrument 102 can transmit the measurement data to the user 110 via the remote server 106. The user 110 can also define suitable options regarding the transmission of measurement data by the laboratory instrument 102. This process is discussed in detail in FIG. 8.

At step 604, the remote server 106 transmits the received data (i.e., measurement data) to the computing device 112. The remote server 106 at step 606, stores the received measurement data from the laboratory instrument 102 along with the identifier of the laboratory instrument 102 in the database 108. The remote server 106 stores the data to track the communication between the laboratory instrument 102 and the user 110 of the computing device 112. At step 608, the remote server 106 may receive updated control instructions from the computing device 112. The user 110 of the computing device 112 may access the received measurement data and modify the control instructions according to the status of the experiment as reflected by the measurement data received from the laboratory instrument 102. The laboratory instrument 102 may be re-programmed by the user 110 via the updated control instruction to achieve the desired experimental results. In an embodiment of the present disclosure, the updated control instruction may include information such as, but not limited to, name of the laboratory instrument 102, chemical or vaccine to be added to the laboratory instrument 102, start time of the experiment, end duration of the experiment, users authorized for the usage of the laboratory instrument 102, and experiments allowed to perform using the laboratory instrument 102, forbidden chemicals, restart/stop instruction, allowed number of experiment cycles, maximum time duration of the experiment to be performed using the laboratory instrument 102, allowed operating parameters, forbidden operating parameters, authorized user details, permittable usage cycles, locking duration of the laboratory instrument 102, or the like. These updated control instructions are transmitted by the remote server 106 to the associated laboratory instrument 102 at step 610.

At step 610, the remote server 106 transmits the updated control instructions to the laboratory instrument 102 identified in the updated control instruction. In an embodiment of the present disclosure, the remote server 106 may also receive response from the laboratory instrument 102 indicating that the control instructions have been updated successfully or that the control instructions have not been updated successfully. In another embodiment of the present disclosure, the remote server 106 may also transmit the received response from the laboratory instrument 102 to the user 110 of the computing device 112 to inform the status of the updated control instructions to the user 110.

At step 612, the remote server 106 may also update the control instruction associated with the laboratory instrument 102 in the database 108 of the remote server 106. In an embodiment, the remote server 106 stores the updated control instruction as a separate version in the database 108 of the remote server 106. The different versions (ongoing as well as old versions) of the control instruction reflects the modifications performed in the experiment process over a period of time. The different versions can be downloaded separately or can be accessed by the authorized users. Thereby, giving the user 110 complete information regarding the experiment without being present physically at the location of the experiment. Additionally, the user 110 can also define the parameters to receive the measurement data associated with the laboratory instrument 102. The detailed process is illustrated in the FIG. 7 of the present disclosure.

Figure 7:
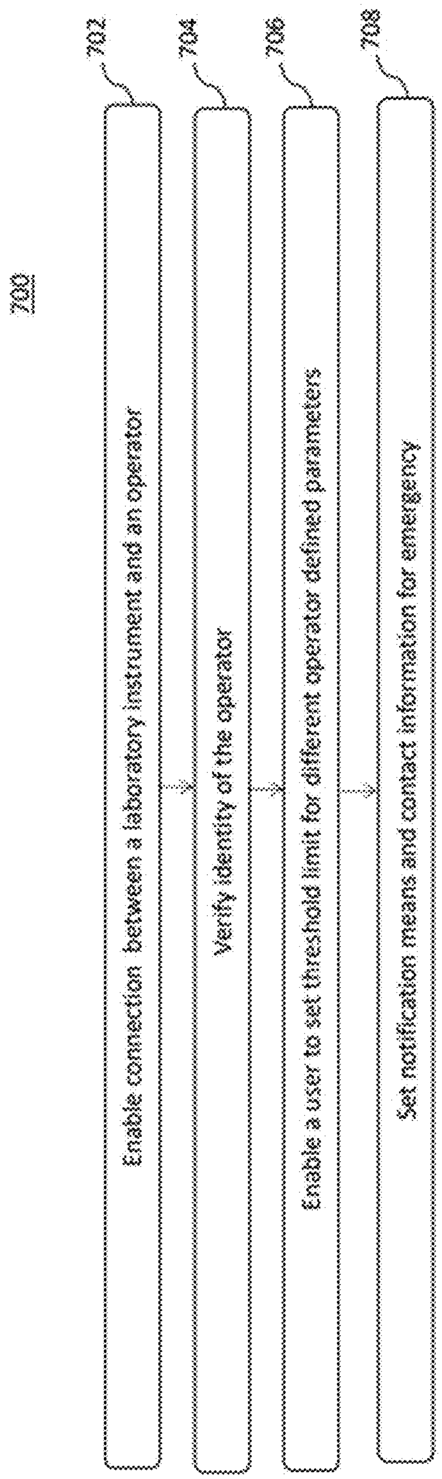
FIG. 7 shows a flowchart illustrating an exemplary workflow for defining notification threshold for a laboratory instrument by a user according to an embodiment of the present disclosure.

The method for defining notification threshold for a laboratory instrument by a user 110 is illustrated by flowchart 700 of FIG. 7. The process begins at step 702, wherein the user 110 starts a communication session with the laboratory instrument 102 via the remote server 106 utilizing the process as explained in FIG. 4 of the present disclosure. After the user 110 has established the communication session after being authenticated by the remote server 106, the remote server 106 verifies the authentication of the user 110 (at step 704) according to the means described earlier in FIG. 4. At step 706, the user 110 may be presented with a screen on the user interface of the computing device 112. The computing device 112 may display different options to specify the notification threshold for the laboratory instrument 102. The laboratory instrument 102 may be configured for different parameters such as, but not limited to, duration for reporting measurement values associated with the experiment, authorized users assigned to receive the notifications, means to receive the notification, exception rules, emergency contact numbers, default contact numbers to be contacted in case of sudden change in the experiment, or the like. In an embodiment of the present disclosure, the user 110 may also define exception rules for different conditions such as, a sudden increase/decrease in the temperature of the environment or the laboratory instrument 102, other parameters such as volume, pressure, smell, smoke, fire, or other sudden environmental changes. The user 110 may program the laboratory instrument 102 to alert the user 110 or other additional users designated by the user 110. In one embodiment of the present disclosure, the user 110 may also define the above said parameters limit. For example, the user 110 may define the standard temperature range, if the temperature of the laboratory instrument 102 or the surroundings of the laboratory instrument goes beyond/below the defined temperature range, the laboratory instrument 102 can automatically alert the user 110 or other additional users designated by the user 110 regarding the incident without user intervention. In one embodiment of the present disclosure, the user 110 can also define other users 110 which can define the threshold parameters, wherein the other users 110 may or may not be associated with the same experiment performed by the laboratory instrument 102.

In some embodiments, the laboratory instrument 102 may be configured to receive one or more glassware therewithin or thereover. The laboratory instrument 102 may further be configured to detect a position of each of the one or more plurality of glassware. In case, a position of any one of the plurality of glassware is not correct, is defective, or is not in compliance, an alert may be generated. In an embodiment, the alert may be a visual alert, indicative of a correct position of that glassware. In a preferred embodiment, the visual alert may be a laser beam or a flashlight indicative of periphery in the correct position. A user or an operator, in such condition, may place the glassware in the correct position.

The laboratory instrument 102 may be configured to be operated in a predefined operational range. The user may specify such predefined operational range, for instance, a capacity of a glassware to be used. The laboratory instrument 102 may generate a corresponding alert in case the capacity of the glassware or the compliance of the glassware does not correspond to the predefined operational range.

At step 708, the user 102 defines notification means and contact numbers to be contacted in case of emergency or during transmission of measurement values. In an embodiment of the present disclosure, the notification means can be selected from a group of an audible notification, a visual notification, a flash message, a pop-up message, haptic notification, multimedia message etc. The user 110 can also define the contact numbers of the other users designated to receive the notifications. In an embodiment, the user 110 may also define priority list of the other users based on their designation. In another embodiment, the user 110 may also designate standard emergency personnel such as company administrator, quality manager, lab manager, ambulance operators, fire extinguisher operators, fire fighters, security personnel, police personnel as the default users to be contacted in case of an emergency situation as indicated by the notification. In another different embodiment of the present disclosure, the notification may be sent to the mobile device, email address, fax numbers and so on as defined by the user 110 or default preference set at the remote server 106.

Figure 8:
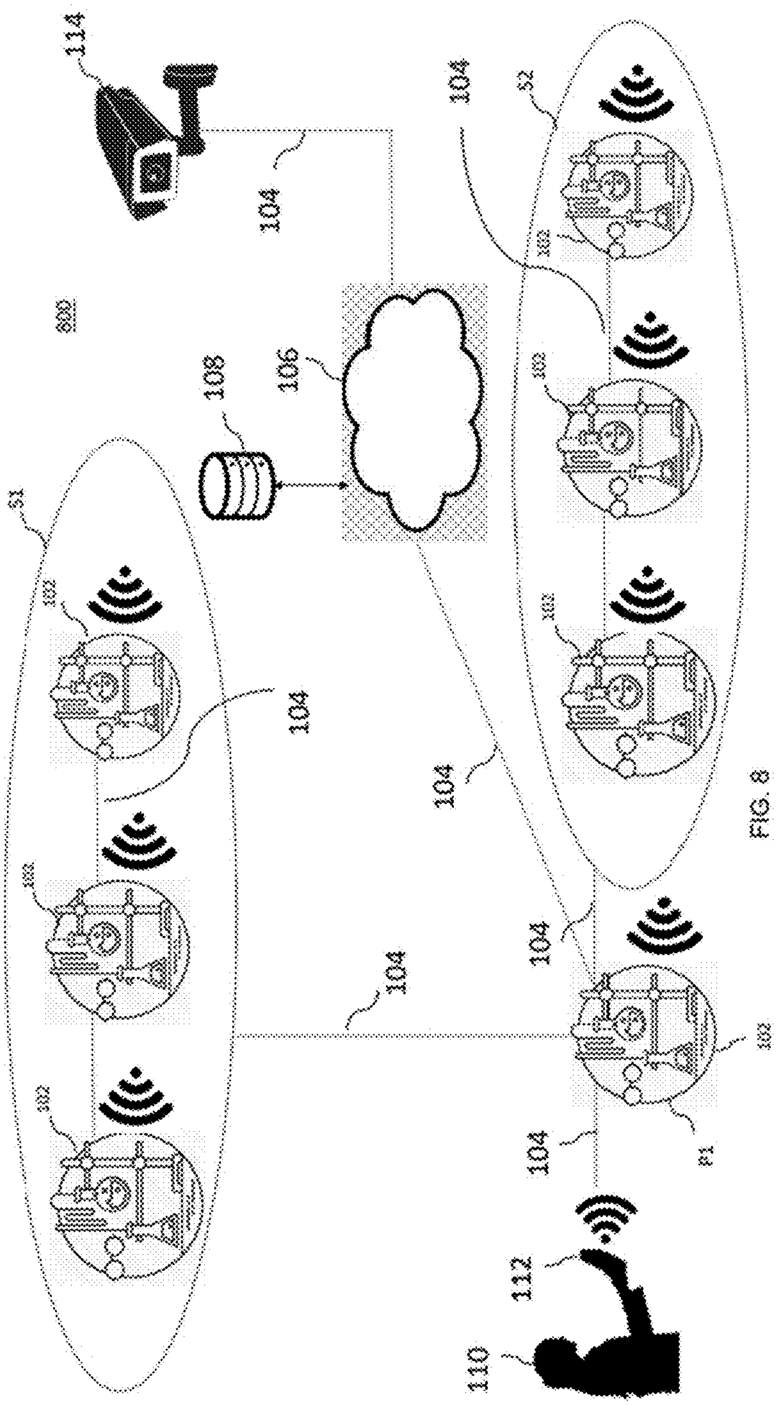
FIG. 8 shows an exemplary environment for controlling multiple laboratory instrument through user created groups in accordance with an embodiment of the present disclosure.

According to an aspect of the present disclosure, the user 110 can monitor the laboratory instrument 102 in user created groups. FIG. 8 discloses an exemplary environment 800 for controlling multiple laboratory instrument 102 through user-created groups in accordance with an embodiment of the present disclosure. The environment 800 comprises one or more sub-groups of laboratory instrument 102 (S1, S2), a primary instrument (P1), the user 110 associated with the computing device 112, the remote server 106, the database 108, the surveillance element 114. Further, the laboratory instrument 102, the computing device 112, the surveillance element 114 and the remote server 106 are connected to each other through a communication link 104.

It is an object of the disclosure to command multiple laboratory instrument 102 using a single-user 110. The user may group one or more laboratory instrument 102 into groups and define different access levels for the user-created group. The group may include the primary instrument (P1) which may be assigned with more privileges in comparison to other laboratory instrument 102. The other laboratory instrument 102 may be assigned as sub-groups of laboratory instrument 102 (S1, S2). The laboratory instrument 102 present in the sub-groups (S1, S2) may be referred as secondary instruments. The secondary instruments may or may not have same access privileges in comparison to the primary instrument (P1) as per the user's requirements.

In an embodiment, the user 110 may provide rights to the primary instrument (P1) to control the secondary instruments present in the sub-groups (S1, S2). For example, the user 110 may send a command to the primary instrument (P1), wherein the command may include the control instructions associated with the secondary instruments. The secondary instruments may be programmed automatically according to the control instructions by the primary instrument (P1), thereby reducing the requirement of multiple operators to control the laboratory instrument 102.

In an embodiment of the present disclosure, the primary instrument (P1) and the secondary instruments present in the sub-groups (S1, S2) may be at same place with similar weather conditions. In another embodiment of the present disclosure, the primary instrument (P1) and the secondary instruments present in the sub-groups (S1, S2) may be at different geographical locations having different weather conditions. The secondary instruments present in the sub-groups (S1, S2) present at different geographical locations having different weather conditions may be assigned to complete a similar experiment and may require similar control instructions for their operation. Therefore, the user 110 can conveniently control the secondary instruments present in the sub-groups (S1, S2) by controlling the primary instrument (P1) assigned with the group.

According to one embodiment, the primary instrument (P1) can work independently without the remote server 106 and the user 110. The user 110 may grant privileges to the primary instrument (P1) to independently control the secondary instruments present in the sub-groups (S1, S2). For example, if the laboratory instrument 102 are engaged in a long term experiment requiring similar operating conditions over the course of time. In such case, the user 110 may utilize laboratory instrument 102 to be included in the sub-groups (S1, S2) having Bluetooth communication capabilities, if the laboratory instrument are placed in a same location. This approach can reduce the infrastructure cost without altering the quality of the experiment. The user 110 may program the primary instrument (P1) to receive measurement data from the secondary instruments and manage the data according to the user programmed instructions. In such exemplary environment, the user 110 can monitor the experiment by utilizing the surveillance element 114. The surveillance element 114 can continuously provide the progress output of the experiment in the form of a video recording to the user 110. In another embodiment of the present disclosure, the surveillance element 114 provides the monitoring data in other forms such as, but not limited to, temperature readings, voltage/current readings, pressure measurements, IR maps, chart/graphical outputs and other visual analytics. The user 110 can monitor the laboratory instrument 102 efficiently without being present at the place giving more time to the user 110 to get engaged in other research and development activities, improve collaboration across their departments, enhance their decision-making capabilities and monitor the laboratory instrument 102 with ease.

In an embodiment the user 110 can create any number of sub-groups of secondary instruments based on the user's requirements. The user 110 can also view the progress of the experiments performed by the laboratory instrument 102 in different user-created groups at the same time using the user's computing device 112. The computing device 112 can be presented with a multiscreen functionality to check, see, and control the working of different laboratory instruments 102 at the same time. For example, in the multiscreen view, the user 110 may be provided with a brief description regarding the progress of the experiments performed by the laboratory instrument 102 in different groups created by the user 110. The user 110 can choose any laboratory instrument 102 to view the detailed progress of the experiment. The progress may be presented in the form of visual analytics such as, but not limited to, a graph, a vein diagram, a pie chart, a bubble chart, or the like.

According to an embodiment of the present disclosure, the user 110 may communicate with the primary instrument (P1) and the secondary instruments present in the sub-groups (S1, S2) via the remote server 106. According to another embodiment of the present disclosure, although the claimed subject matters is not limited in this respect, the user 110 can communicate with the primary instrument (P1) and the secondary instruments present in the sub-groups (S1, S2) using the computing device 112. In one particular embodiment, such a computing device platform may be capable of hosting "rich-client" applications that are hosted on the computing device 112 platform. Alternatively, the computing device 112 platform may enable a user 110 to interact with web applications through the communication interface. The detailed process of user 110 interaction with the remote server 106 to create groups of laboratory instrument 102 is illustrated by flowchart 900 of FIG. 9.

Figure 9:
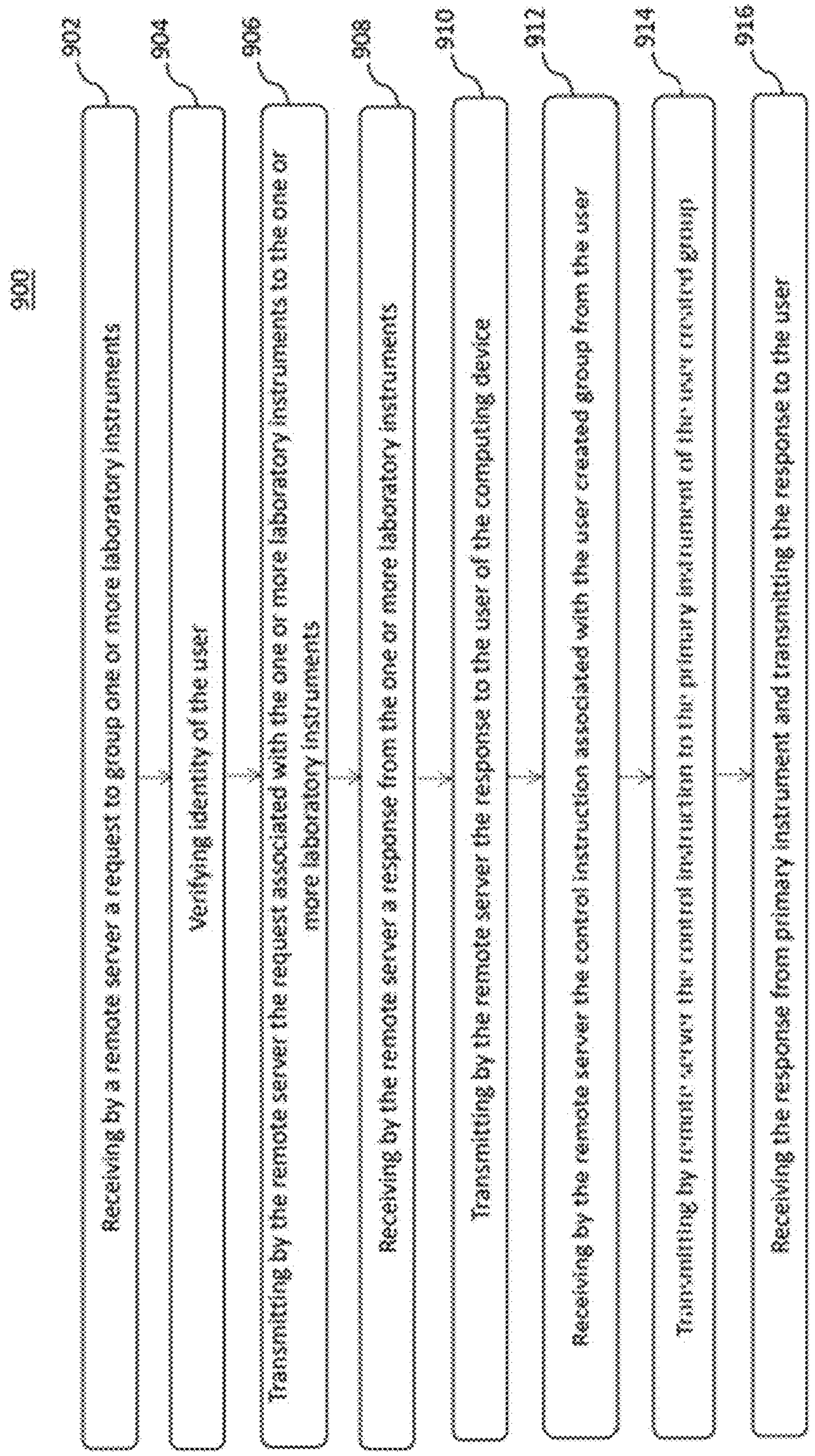
FIG. 9 shows a flowchart illustrating an exemplary workflow for creating groups of laboratory instrument, by the user via the remote server in accordance with an embodiment of the present disclosure.

FIG. 9 illustrates a method for creating groups of laboratory instrument 102, by the user 110 via the remote server 106 according to an aspect of the present disclosure. The process begins at step 902, wherein the remote server 106 receives a request by the user 110 to group one or more laboratory instruments 102. The user's request may include a relationship instruction associated with the one or more laboratory instrument 102. The laboratory instrument 102 may be grouped according to the relationship instruction. The relationship instruction comprises information related to identifier of at least one of the laboratory instrument 102 to be designated as the primary instrument and remaining laboratory instruments 102 or subset of the remaining laboratory instruments 102 as the secondary instruments. In an embodiment of the present disclosure, the user 110 may assign a single primary instrument (P1) or multiple primary instruments (P1) according to the user's requirement. In another embodiment of the present disclosure, the user 110 may also send a group name and the permissions associated with the members of the group along with the grouping request. The remote server 106 updates a group identifier information to the identifier of the one or more laboratory instruments 102 stored in the remote server 106.

The remote server 106 verifies the identity of the user 110 at step 904, before transmitting the request to the laboratory instruments 102. The remote server 106 may query the user 110 to enter the authentication credentials using the computing device 112.

Further, the remote server 106 may authenticate the user 110 using the authentication module 306. Here, for example, the application program running on the computing device 112 of the user 110 may transmit the authentication credentials to the authentication module 306 of the remote server 106 to authenticate the user 110. In response, the authentication module 306 of the remote server 106 may query one or more authentication sources (not shown) for information indicating the identity of the user 110. In one embodiment, the authentication sources may comprise any one of several commercially available authentication services. In other embodiments, authentication sources may comprise databases storing biometric signatures, smartcard data and/or the like. However, these are merely examples of authentication sources comprising information that may be used to verify an identity of a user and claimed subject matter is not limited in these respects.

Based, at least in part, on information from authentication sources and in response to the authentication request from the application program, the authentication module 306 of the remote server 106 may determine whether or not the user 110 can be authenticated successfully. Upon authenticating the user 110, remote server 106 may transmit a true response of this authentication of the user back to the application program.

Once user 110 is authenticated, the process moves to step 906, wherein the remote server 106 transmits the request associated with the one or more laboratory instrument 102 to the one or more laboratory instrument 102 identified in the request. The laboratory instruments 102 configure themselves according to the relationship instruction and transmit a corresponding response to the remote server 106. The remote server 106 receives the response from the one or more laboratory instruments 102 at step 908 and transmits the received response to the user 110 of the computing device 112 at step 910. At this step, the server may also store the response along with the identifier of the laboratory instruments 102 in the database 108 of the remote server 106. The remote server 106 may also store the group name and the designation of the laboratory instruments 102 (i.e., primary instrument (P1) or secondary instrument(s)) along with the identifier of the laboratory instruments in the database 108.

At step 912, the remote server 106 receives the control instruction associated with the user created group from the user 110. The user 110 may transmit the control instructions comprising one or more of, duration of the experiment, temperature, volume, pressure values according to weather conditions of the geographical location in which the laboratory instrument 102 is placed, chemicals/vaccines allowed during the experiment, forbidden chemicals/vaccines, locking period of the experiment, users assigned with the experiment, notification threshold and parameters, start time of the experiment, end time of the experiment, allowed number of experiment cycles, permittable usage cycles, or the like.

At step 914, the remote server 106 transmits the control instructions to the primary instrument (P1) identified in the request. The primary instrument (P1) automatically transmits the control instructions to the secondary instruments of the user created group (S1, S2). In an embodiment of the present disclosure, the user 110 makes the primary instrument (P1) as the point of contact for communications related to the progress of the experiment. The experiment progress (i.e., measurement data) of the secondary instruments of the user created group (S1, S2) may be received by the primary instrument (P1). The primary instrument (P1) may be assigned privileges to monitor the secondary instruments and transmit the measurement data obtained from the secondary instruments of the user created group (S1, S2) to the user 110. By using this approach, the user 110 is able to receive a consolidated report from multiple laboratory instruments 102 instead of receiving separate reports from the laboratory instruments 102.

At step 916, the remote server 106 receives response from the primary instrument (P1). The primary instrument (P1) may transmit a collective response i.e. response received from the entire group including the primary instrument (P1) and the secondary instruments of the user created group (S1, S2). The remote server 106 receives the response and transmits the response to the user 110. The user 110 may receive the response in the form of a picture, a video, an animation, a graph, a vein diagram, a pie chart, a bubble chart, or the like.

Simultaneously at this step 916, the remote server 106 may store the response along with the identifier of the laboratory instrument 102. The response can be downloaded by the user 110 or can be transmitted to other authorized users based on the user's request.

In an embodiment of the disclosure, the user 110 can send separate control instructions associated with separate secondary instruments to the primary instrument (P1). The control instructions can also include preset alarms for user 110 defined events. For example, the user 110 may wish to get update regarding a specific stage of the experiment performed by the secondary instrument. The user 110 can program the primary instrument (P1) to send alerts for such user defined events. In another embodiment of the present disclosure, the user 110 can also define a locking period for some subset of the secondary instruments. The locking period may include parameters such as, but not limited to, time, purpose, name of the experimenter and so on. For example, the secondary instrument may be assigned for a specific experiment. The user 110 may define the locking period in order to prevent the usage of the secondary instrument for other experiments other than the specific experiment defined in the control instruction.

The laboratory instruments according to the disclosure are devices which are used to carry out chemical, biochemical, biological or microbiological processes, such as syntheses, sample preparation and analyzes. As already mentioned, laboratory instruments in the sense of the disclosure can be, for example, any type of sample dosing device, sample transport device, sample separation device, sample purification device, sample storage device, sample conversion device, sample testing device or sample analysis device.

As any unauthorized attempt made to access the laboratory instrument or information related to the laboratory instrument is effectively thwarted, the present disclosure provides an efficient way to monitor a plurality of laboratory instruments from a remote location for a particular experiment using the laboratory instrument or using glassware along with the laboratory instrument with a particular chemical, vaccine, diagnosis, etc.

Although the present disclosure has been described in terms of certain preferred embodiments, various features of separate embodiments can be combined to form additional embodiments not expressly described. Moreover, other embodiments apparent to those of ordinary skill in the art after reading this disclosure are also within the scope of this disclosure. Furthermore, not all of the features, aspects and advantages are necessarily required to practice the present disclosure. Thus, while the above detailed description has shown, described, and pointed out novel features of the disclosure as applied to various embodiments, it will be understood that various omissions, substitutions, and changes in the form and details of the apparatus or process illustrated may be made by those of ordinary skill in the technology without departing from the spirit of the disclosure. The disclosure may be embodied in other specific forms not explicitly described herein. The embodiments described above are to be considered in all respects as illustrative only and not restrictive in any manner. Thus, scope of the disclosure is indicated by the following claims rather than by the foregoing description.

I claim:

1. A method for establishing a connection between a laboratory instrument and a computing device, the method being performed by a remote server, the method comprising:

receiving a connection request associated with the laboratory instrument from the computing device using a communication link, wherein the connection request includes a signaling identifier associated with the laboratory instrument;

transmitting the signaling identifier to the laboratory instrument;

receiving a response from the laboratory instrument, wherein the remote server establishes a connection between the computing device and the laboratory instrument if the response received is positive;

receiving one or more control instructions associated with the laboratory instrument from the computing device, wherein the one or more control instructions include control parameters associated with the laboratory instrument, the one or more control instructions being provided for remotely controlling the laboratory instrument, wherein the control parameters comprising a name of the laboratory instrument, a start duration and an end duration of the laboratory instrument, information of one or more users authorized for usage of the laboratory instrument, and one or more experiments allowed to be performed using the laboratory instrument;

transmitting the one or more control instructions to the laboratory instrument;

receiving a response from the laboratory instrument indicating installation of the one or more control instructions associated with the laboratory instrument, wherein the response comprises an acknowledgment of configuration of the one or more control instructions in the laboratory instrument; and transmitting the response to the computing device, wherein the remote server stores the one or more control instructions comprising the control parameters, along with an identifier associated with the laboratory instrument in a database of the remote server.

2. The method as claimed in claim 1, wherein the computing device is operated by a user, wherein the user is a technician, a lab operator, a scientist, a researcher, a technologist, an examiner, or a chemical expert; and wherein the user is located at the same location or at a remote location from the laboratory instrument.

3. The method as claimed in claim 1, further comprising determining by the remote server, before transmitting the signaling identifier to the laboratory instrument, whether the user of the computing device is an authorized user, wherein the user is authorized based on the authentication details provided by the user.

4. The method as claimed in claim 1, wherein the signaling identifier comprises one or more of a pairing request, an identifier, a pairing code, a password, and an instrument id associated with the laboratory instrument.

5. The method as claimed in claim 1, wherein the control parameters further comprises usage model of the laboratory instrument, life of the laboratory instrument, duration of use of the laboratory instrument, and chemical or vaccine to be used in the laboratory instrument.

6. The method as claimed in claim 5, further comprising:

receiving a measurement data associated with the laboratory instrument, wherein the measurement data includes one or more measurement parameters associated with the laboratory instrument;

transmitting the measurement data to the computing device, wherein the remote server stores the measurement data along with the identifier of the laboratory instrument in the database of the remote server;

receiving updated control instructions from the computing device; and transmitting the updated control instructions to the laboratory instrument, wherein the remote server stores the updated control instructions corresponding to the identifier of the laboratory instrument in the database of the remote server;

wherein the updated control instructions comprise an updated version of the one or more control instructions, the updated version including the control parameters.

7. The method as claimed in claim 1, comprising remotely controlling one or more laboratory instruments by the computing device, wherein the step of remotely controlling one or more laboratory instruments comprises the steps of:

receiving, by the remote server, a request from the computing device to group one or more laboratory instruments, wherein the request includes a relationship instruction associated with the one or more laboratory instruments;

transmitting, by the remote server, the request associated with the one or more laboratory instruments to group the one or more laboratory instruments;

receiving, by the remote server, a response from the one or more laboratory instruments, wherein the response indicates the identifiers and acknowledgement from the one or more laboratory instruments; and transmitting, by the remote server, the response to the computing device, wherein the remote server stores the identifiers of the one or more laboratory instruments received along with a group name of the one or more laboratory instruments.

8. The method as claimed in claim 7, wherein the relationship instruction comprises information related to identifier of at least one of the one or more laboratory instruments to be designated as a primary instrument and remaining one or more laboratory instruments or subset of the remaining one or more laboratory instruments as the secondary instruments.

9. The method as claimed in claim 8, wherein the primary instrument receives control instructions from the computing device to control the secondary instruments; and wherein the primary instrument is configured for working with or without the remote server.

10. The method as claimed in claim 8, wherein the primary instrument and the secondary instruments are located at a same location or at different geographical locations.

11. The method as claimed in claim 7, wherein the group name is provided along with the group request by the computing device.

12. The method as claimed in claim 7, wherein the remote server updates a group identifier information to the identifier of the one or more laboratory instruments stored in the remote server.

13. The method as claimed in claim 1, wherein any one of the remote server, the computing device and the laboratory instrument comprises an artificial intelligence (AI) module, the AI module is configured for monitoring the laboratory instrument for a sudden change in the laboratory instrument, and further configured for generating an analytical comparative report associated with each experiment being performed by or on the laboratory instrument without human interference, the analytical report being generated by processing one or more parameters associated with each experiment to correctly define the experiment.

14. A system for enabling remote monitoring of a laboratory instrument, the system comprising:

a plurality of computing devices;

a remote server, wherein the remote server is configured to:

receive a connection request associated with the laboratory instrument from the computing device, wherein the connection request includes a signaling identifier associated with the laboratory instrument;

transmit the signaling identifier to the laboratory instrument;

receive a response from the laboratory instrument, wherein the remote server establishes a connection between the computing device and the laboratory instrument if the response received is positive;

receive one or more control instructions associated with the laboratory instrument from the computing device, wherein the one or more control instructions include control parameters associated with the laboratory instrument, the one or more control instructions being provided for remotely controlling the laboratory instrument, wherein the control parameters comprising a name of the laboratory instrument, a start duration and an end duration of the laboratory instrument, information of one or more users authorized for usage of the laboratory instrument, and one or more experiments allowed to be performed using the laboratory instrument;

transmit the one or more control instructions to the laboratory instrument;

receive a response from the laboratory instrument indicating installation of the one or more control instructions associated with the laboratory instrument, wherein the response comprises an acknowledgment of configuration of the one or more control instructions in the laboratory instrument;

transmit the response to the computing device, wherein the remote server stores the one or more control instructions comprising the control parameters, along with an identifier associated with the laboratory instrument in a database of the remote server;

receive updated control instructions from the computing device;

transmit the updated control instructions to the laboratory instrument, wherein the remote server stores the updated control instructions along with the identifier in the database of the remote server;

receive a request from the computing device to group one or more laboratory instruments, wherein the request includes identifiers of the laboratory instruments to be grouped, wherein the request received from the computing device includes a relation instruction comprising information related to identifier of at least one of the one or more laboratory instruments to be designated as a primary instrument and the remaining one or more laboratory instruments or subset of the remaining one or more laboratory instruments as the secondary instruments;

transmit the request from the computing device to the one or more laboratory instruments;

receive a response from the one or more laboratory instruments, wherein the response includes acknowledgment from the one or more laboratory instruments; and transmit the response to the computing device, wherein the remote server stores the identifiers of the one or more laboratory instruments along with a group name in the remote server; and a communication link for providing communication between the plurality of computing devices, the remote server, and the laboratory instrument.

15. The system as claimed in claim 14, wherein the updated control instructions comprise an updated version of the one or more control instructions, the updated version including the control parameters.

16. The system as claimed in claim 14, further comprising determining by the remote server, before transmitting the user instructions to the laboratory instrument, whether the user of the computing device is an authorized user, wherein the user is authorized based on authentication details provided by the user.

17. The system as claimed in claim 14, wherein the one or more laboratory instruments comprise a communication interface configured to receive a request of the computing device from the remote server and transmit the acknowledgement to the remote server for the request of the computing device, wherein the acknowledgement comprise of either a positive response or a negative response.

18. The system as claimed in claim 14, wherein the laboratory instrument comprises a user interface selected from any one of a GUI, touchscreen, keyboard, mouse, keypad, and a combination thereof.

19. The system as claimed in claim 14, wherein the laboratory instrument comprises:

one or more operating sensors configured to operate the laboratory instrument, the one or more operating sensors comprise a face recognizer, a voice sensor, a retina sensor, and a gesture sensor; and one or more measurement sensors configured to measure one or more measurement parameters of the laboratory instrument, one or more laboratory glassware, or surrounding parameters, the one or more measurement sensors comprises a pH meter, a weight sensor, or a weighing balance, a temperature sensor, an odor sensor, and a color sensor.

20. The system as claimed in claim 14, further comprising:

an alert module configured to alert the user by generating an alert in the event of sudden changes in the laboratory instrument; and an artificial intelligence (AI) module, wherein the AI module is a part of any one of the plurality of computing devices, the laboratory instrument and the remote server.

* * * * *